April 22, 1958     G. KLEMT     2,831,396
OPTICAL SYSTEM WITH INTERCHANGEABLE COMPONENTS
FOR VARIATION OF IMAGE SCALE
Filed Oct. 20, 1955

INVENTOR:
Günter Klemt
BY Karl F. Ross
AGENT

United States Patent Office 2,831,396
Patented Apr. 22, 1958

2,831,396

OPTICAL SYSTEM WITH INTERCHANGEABLE COMPONENTS FOR VARIATION OF IMAGE SCALE

Günter Klemt, Kreuznach, Rhineland, Germany, assignor to Jos. Schneider & Co., Optische Werke, Kreuznach, Rhineland, Germany Application October 20, 1955, Serial No. 541,776

Claims priority, application Germany October 20, 1954

4 Claims. (Cl. 88—57)

The present invention relates to an optical system wherein one or more of the components of a photographic objective or the like, of normal focal length, are replaceable by a lens assembly adapted to produce, in combination with the remaining components of the basic objective, an exchange objective of substantially the same image distance but different focal length.

Optical systems are already known in which the front half of a Gaussian dual objective, facing the object, is replaceable by a lens assembly including an afocal combination, such as a Galilean telescope (for increased focal lengths) or an inverted Galilean telescope (for reduced focal lengths). While these systems represent distinct improvements over earlier objectives of the type referred to, they still were useful only within a limited range which could not be exceeded, especially in the case of a telephoto objective, without requiring impractically large lens dimensions. Systems of this character have been disclosed, for example, in my co-pending applications Ser. Nos. 438,174 and 438,511, filed June 21, 1954 and June 22, 1954, respectively, Ser. No. 438,174 now being Patent No. 2,796,002 dated June 18, 1957.

The general object of my present invention is to provide an exchange lens assembly for a normal-view objective system adapted to convert the latter into an exchange objective with very large image scale ratio.

Another object of the instant invention is to provide a lens attachment for photographic cameras designed to adapt same for the taking of close-ups.

A feature of my present invention resides in the provision of means for producing an intermediate image within the objective system. This includes, more specifically, an assembly of lens components designed to replace the front portion of the principal or normal-view objective, the rearwardly located components of this assembly (adjacent the diaphragm space) representing a substitute for the front portion of the principal objective whereas the forwardly located components have the character of an ocular or eyepiece. Both sets of components, if suitably proportioned, co-operate with the remaining rear portion of the principal objective to form an optical system whose focal length has been so foreshortened that at or near the focal plane of the principal objective (i. e. its image plane with the object at infinity) there will now exist a new image plane whose distance from the system will be approximately equal to that of its conjugate object plane; this corresponds to an image scale ratio of the order of 1:1.

It is, accordingly, a more particular object of this invention to provide an exchange lens assembly as set forth above which, when combined with the fixed part of a normal-view objective, furnishes an objective whose image and object distances have a ratio of the order of unity.

I have found, in accordance with a further feature of this invention, that the preceding object may be realized by means of a lens assembly including two sub-assemblies, the forwardly positioned sub-assembly (i. e. the one facing the object) comprising three air-spaced lens elements including a negatively refracting front meniscus, turning its concave side toward the object plane, and two rearwardly positioned biconvex lens elements; the other sub-assembly comprises two air-spaced menisci of opposite refractivity, turning their convex sides toward the diaphragm space, one of which consists of a glass having an index of refraction greater than 1.7 for the yellow helium line.

An exchange objective constructed in accordance with the foregoing features can be designed for a ratio of object distance to image distance ranging between 1:0.8 and 1:1.2 while substantially maintaining the image distance of the original normal-view objective. The overall focal length of such exchange objective may be modified, if desired, with the aid of known auxiliary objective systems positioned in front thereof.

A further object of my invention is to provide an exchange objective system of the character described which is corrected, with respect to the conjugate image and object planes, for all optional aberrations, in this connection it is desirable, with a view to insuring chromatism, to use a compound lens as one of the components of the forward sub-assembly.

The invention will be described in greater detail with reference to the accompanying drawing in which.

Figure 1:
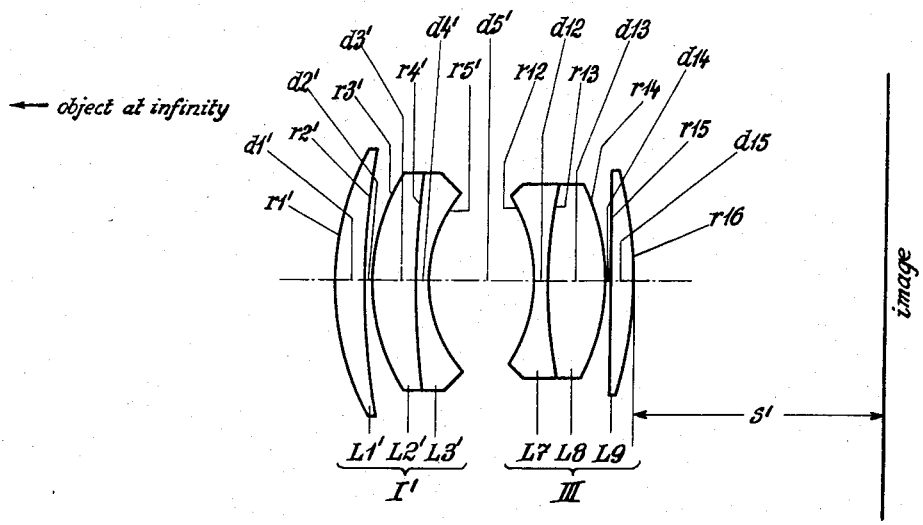
Fig. 1 shows diagrammatically a normal-view objective of the Gaussian type.

In Fig. 1 there has been shown a conventional Gaussian dual objective of the type shown in Fig. 1 of each of my aforementioned co-pending applications. The front half I' of this objective comprises a positive meniscus $L_1'$ whose radii are $r_1'$, $r_2'$ and whose thickness is $d_1'$, followed by a compound negative meniscus member composed of lenses $L_2'$ (radii $r_3'$, $r_4'$ and thickness $d_3'$) and $L_3'$ (radii $r_4'$, $r_5'$ and thickness $d_4'$), the spacing between the two members being designated $d_2'$. Rear half III consists of a compound negative meniscus member composed of lenses $L_7$ (radii $r_{12}$, $r_{13}$ and thickness $d_{12}$) and $L_8$ (radii $r_{13}$, $r_{14}$ and thickness $d_{13}$) followed by a positive lens member $L_9$ (radii $r_{15}$, $r_{16}$ and thickness $d_{15}$), the spacing between the two last-mentioned members being designated $d_{14}$. The relatively large distance $d_5'$ between objective portions I' and III defines a diaphragm space adapted to receive the usual iris diaphragm and shutter (not shown).

With an aperture ratio of 1:2, an overall focal length given the numerical value of 100 and an image distance $S'=72.4$, the radii, thicknesses and spacing of the elements of the system of Fig. 1, together with their refractive indices $n_d$ and Abbé numbers $v$, may be as follows:

Table A

|   |   |   |   | $n_d$ | $v$ |
|---|---|---|---|---|---|
| I | $L_1'$ | $r_1'=+\ 54.83$<br>$r_2'=+156.25$ | $d_1 = 6.71$<br>$d_2 = 1.27$ | 1.67003<br>(Air space) | 47.2 |
|   | $L_2'$ | $r_3'=+\ 39.67$<br>$r_4'=+168.32$ | $d_3 = 8.93$<br>$d_4 = 3.52$ | 1.69347<br>1.66446 | 53.5<br>35.9 |
|   | $L_3'$ | $r_5'=+\ 25.89$ | $d_5 =21.21$ | (Diaphragm space) | |
| III | $L_7$<br>$L_8$ | $r_{12}=-\ 30.20$<br>$r_{13}=+\ 90.18$<br>$r_{14}=-\ 41.87$ | $d_{12}= 3.17$<br>$d_{13}=11.88$<br>$d_{14}= 0.21$ | 1.63980<br>1.65844<br>(Air space) | 34.6<br>50.8 |
|   | $L_9$ | $r_{15}=+2359.37$<br>$r_{16}=-\ 77.24$ | $d_{15}= 5.25$ | 1.74472 | 44.7 |

Figure 2:
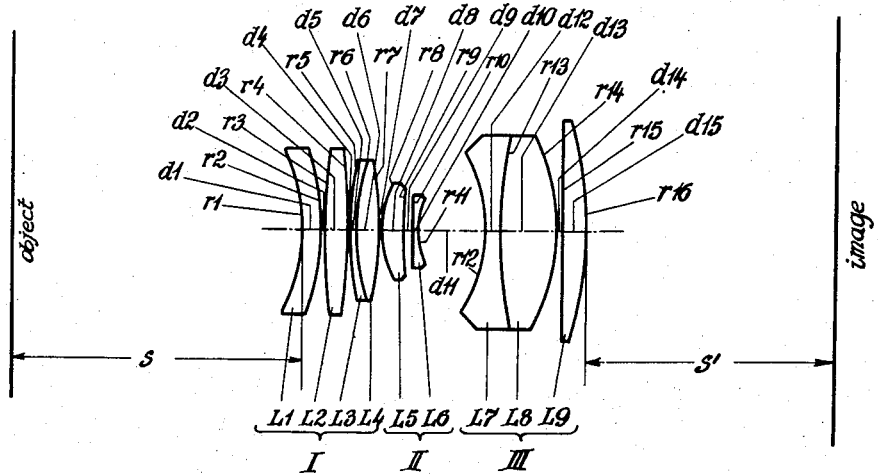
Fig. 2 illustrates an exchange objective obtained by replacing the front part of the objective of Fig. 1 with a lens assembly according to the invention.

In the exchange objective of Fig. 2 the lens group I' of Fig. 1 has been replaced by an assembly including two sub-assemblies I and II. Forward sub-assembly I comprises a negative meniscus $L_1$ (radii $r_1$, $r_2$ and thickness $d_1$) followed by a simple biconvex lens $L_2$ (radii $r_3$, $r_4$ and thickness $d_3$) and by a negative meniscus $L_3$ (radii $r_5$, $r_6$ and thickness $d_5$) cemented onto a biconvex lens element $L_4$ (radii $r_6$, $r_7$ and thickness $d_6$) to form a compound biconvex lens; the air space between members $L_1$ and $L_2$ has been designated $d_2$, the air space between members $L_2$ and $L_3$ has been designated $d_4$. Rear sub-assembly II comprises a positive menicus $L_5$ (radii $r_8$, $r_9$ and thickness $d_8$) followed by a negative meniscus $L_6$ (radii $r_{10}$, $r_{11}$ and thickness $d_{10}$); the air space between the menisci $L_5$, $L_6$ is designated $d_9$. The spacing between the two sub-assemblies I and II has been indicated at $d_7$. At $d_{11}$ there has been shown the diaphragm space of the exchange objective.

With an aperture ratio of 1:5.6, an overall focal length of 54.6, an object distance $S=82.7$ and an image distance $S'=72.2$, the radii, thicknesses, spacings, refractive indices and Abbé numbers of the exchange assembly I, II in Fig. 2 may be as follows:

Table B

|   |   |   |   | $n_d$ | $v$ |
|---|---|---|---|---|---|
| I | $L_1$ | $r_1 = -35.31$ | $d_1 = 5.09$ | 1.68893 | 31.1 |
|   |   | $r_2 = -50.16$ | $d_2 = 0.21$ | (Air space) |   |
|   | $L_2$ | $r_3 = +135.48$ | $d_3 = 4.22$ | 1.62041 | 60.3 |
|   |   | $r_4 = -147.47$ | $d_4 = 0.42$ | (Air space) |   |
|   | $L_3$ | $r_5 = +68.38$ | $d_5 = 1.69$ | 1.67270 | 32.2 |
|   | $L_4$ | $r_6 = +44.72$ | $d_6 = 4.92$ | 1.50657 | 62.0 |
|   |   | $r_7 = -72.22$ | $d_7 = 0.21$ | (Air space) |   |
| II | $L_5$ | $r_8 = +20.21$ | $d_8 = 5.49$ | 1.72000 | 50.3 |
|   |   | $r_9 = +86.48$ | $d_9 = 1.58$ | (Air space) |   |
|   | $L_6$ | $r_{10} = +312.19$ | $d_{10} = 1.69$ | 1.61659 | 36.6 |
|   |   | $r_{11} = +14.92$ | $d_{11} = 13.72$ | (Diaphragm space) |   |

As will be noted from the foregoing example, the exchange assembly according to the invention includes two sub-assemblies which are of the character previously specified and in which the positive meniscus $L_5$ of sub-assembly II has an index of refraction greater than 1.7 for the yellow helium line.

The objective system shown in Fig. 2 may be supplemented by an auxiliary lens system comprising, for example, a pair of biconvex lenses flanking the object plane and a telescope objective positioned ahead of this plane. With an objective system having the parameters given in Tables A and B, the telescope objective may have a focal length equal to or larger than 150.

I claim:

1. A front lens assembly adapted to replace the front half of a Gaussian dual objective whose front and rear halves define between them a diaphram space, each of said halves comprising a dispersive lens meniscus adjacent said diaphragm space and facing same with its concave side as well as a positive lens beyond said meniscus; said assembly comprising a pair of air-spaced lens sub-assemblies including a forward lens sub-assembly having three air-spaced lens components and a rear lens sub-assembly with two air-spaced lens menisci of opposite refractivity, the foremost one of said components being a negatively refracting lens meniscus with a forwardly facing concave side, the other two of said components being biconvex lens members, said menisci of opposite refractivity having rearwardly facing concave sides, one of said menisci of opposite refractivity having an index of refraction greater than 1.7 for the yellow helium line.

2. A lens assembly according to claim 1, wherein one of said biconvex lens members is a compound lens.

3. In an optical objective system, in combination, a front lens assembly and a rear lens assembly detachable from each other and defining between them a diaphragm space, said rear lens assembly comprising a dispersive lens meniscus adjacent said diaphragm space and facing same with its concave side as well as a positive lens back of said meniscus, said front assembly comprising a forward and a rear lens sub-assembly air-spaced from each other; said forward sub-assembly comprising three air-spaced lens components including a negatively refracting front lens meniscus with a forwardly facing concave side and two biconvex lens members back of said front lens meniscus; said rear sub-assembly comprising two air-spaced lens menisci of opposite refractivity having rearwardly facing concave sides, one of the last-mentioned menisci having an index of refraction greater than 1.7 for the yellow helium line, the components of said front and rear lens assemblies being so dimensioned that the spacing of an image plane from the rearmost component and the spacing of a conjugate object plane from the foremost component have a ratio of the order of unity.

4. The combination according to claim 3, wherein said rear assembly is adapted to co-operate with a roughly mirror-symmetrical lens assembly to form a Gaussian dual objective of predetermined focal length and image distance, said front and rear assemblies together having an image distance substantially equal to and an overall focal length considerably shorter than that of said Gaussian dual objective, the second one of said biconvex lens members and said dispersive meniscus consisting of a negative and a positive lens component cemented together; the radii $r_1$, $r_2$ and the thickness $d_1$ of said front meniscus $L_1$, the spacing $d_2$ of said front meniscus from the first biconvex lens member $L_2$, the radii $r_3$, $r_4$ and the thickness $d_3$ of said lens member $L_2$, the spacing $d_4$ of the latter from said second biconvex lens member, the radii $r_5$ and $r_6$ and the thickness $d_5$ of the negative component $L_3$ of said second biconvex lens member, the radii $r_6$, $r_7$ and the thickness $d_6$ of the positive component $L_4$ of said second biconvex lens member, the spacing $d_7$ of the last mentioned component from the positively refracting meniscus $L_5$ of said rear sub-assembly, the radii $r_8$, $r_9$ and the thickness $d_8$ of said meniscus $L_5$, the spacing $d_9$ of said meniscus $L_5$ from the negatively refracting meniscus $L_6$ of said rear sub-assembly, the radii $r_{10}$, $r_{11}$ and the thickness $d_{10}$ of said meniscus $L_6$, and the length of the diaphragm space $d_{11}$ separating said meniscus $L_6$ from said rear assembly, as well as the refractive indices $n_d$ and Abbé numbers $v$ of the components $L_1$–$L_6$ of said front assembly having numerical values substantially as given in the following Table B; the radii $r_{12}$, $r_{13}$ and the thickness $d_{12}$ of the negative component $L_7$ of said dispersive meniscus, the radii $r_{13}$, $r_{14}$ and the thickness $d_{13}$ of the positive component $L_8$ of said dispersive meniscus, the spacing $d_{14}$ of the last-mentioned component from the positive lens $L_9$ of said assembly, the radii $r_{15}$, $r_{16}$ and the thickness $d_{15}$ of said lens $L_9$, as well as the refractive indices $n_d$ and the Abbé numbers $v$ of the components $L_7$–$L_9$ of said rear assembly having numerical values substantially as given in the following Tables A and B; the numerical values of said radii, thicknesses and spacings being based upon a numerical value of 100 for the overall focal length of said Gaussian dual objective; said front and rear assemblies together defining an exchange objective having an overall focal length of substantially 54.6, an image distance of substantially 72.2 and an object distance of substantially 82.7:

Table A

| | | | $n_d$ | $\nu$ |
|---|---|---|---|---|
| $L_1'$ | $r_1'=+\ 54.83$ | $d_1=\ 6.71$ | 1.67003 | 47.2 |
| | $r_2'=+156.25$ | $d_2=\ 1.27$ | (Air space) | |
| $L_2'$ | $r_3'=+\ 39.67$ | $d_3=\ 8.93$ | 1.69347 | 53.5 |
| | $r_4'=+168.32$ | $d_4=\ 3.52$ | 1.66446 | 35.9 |
| $L_3'$ | $r_5'=+\ 25.89$ | $d_5=21.21$ | (Diaphragm space) | |
| $L_7$ | $r_{12}=-\ 30.20$ | $d_{12}=\ 3.17$ | 1.63980 | 34.6 |
| $L_8$ | $r_{13}=+\ 90.18$ | $d_{13}=11.88$ | 1.65844 | 50.8 |
| | $r_{14}=-\ 41.87$ | $d_{14}=\ 0.21$ | (Air space) | |
| $L_9$ | $r_{15}=+2359.37$ | $d_{15}=\ 5.25$ | 1.74472 | 44.7 |
| | $r_{16}=-\ 77.24$ | | | |

Table B

| | | | $n_d$ | $\nu$ |
|---|---|---|---|---|
| $L_1$ | $r_1=-\ 35.31$ | $d_1=\ 5.09$ | 1.68893 | 31.1 |
| | $r_2=-\ 50.16$ | $d_2=\ 0.21$ | (Air space) | |
| | $r_3=+135.48$ | | | |
| $L_2$ | $r_4=-147.47$ | $d_3=\ 4.22$ | 1.62041 | 60.3 |
| | | $d_4=\ 0.42$ | (Air space) | |
| | $r_5=+\ 68.38$ | | | |
| $L_3$ | $r_6=+\ 44.72$ | $d_5=\ 1.69$ | 1.67270 | 32.2 |
| $L_4$ | $r_7=-\ 72.22$ | $d_6=\ 4.92$ | 1.50657 | 62.0 |
| | | $d_7=\ 0.21$ | (Air space) | |
| | $r_8=+\ 20.21$ | | | |
| $L_5$ | $r_9=+\ 86.48$ | $d_8=\ 5.49$ | 1.72000 | 50.3 |
| | | $d_9=\ 1.58$ | (Air space) | |
| | $r_{10}=+312.19$ | | | |
| $L_6$ | $r_{11}=+\ 14.92$ | $d_{10}=\ 1.69$ | 1.61659 | 36.6 |
| | | $d_{11}=13.72$ | (Diaphragm space) | |

References Cited in the file of this patent

UNITED STATES PATENTS

| | | |
|---|---|---|
| 583,336 | Rudolph | May 25, 1897 |
| 660,202 | Rudolph | Oct. 23, 1900 |
| 2,117,252 | Lee | May 10, 1938 |
| 2,169,130 | Tronnier et. al. | Aug. 8, 1939 |
| 2,662,447 | Tronnier | Dec. 15, 1953 |

FOREIGN PATENTS

| | | |
|---|---|---|
| 472,234 | Germany | Mar. 5, 1929 |
| 1,097,695 | France | Feb. 23, 1955 |
| 1,102,390 | France | May 4, 1955 |